United States Patent
Lyon et al.

(10) Patent No.: US 8,287,958 B2
(45) Date of Patent: Oct. 16, 2012

(54) GLAZING

(75) Inventors: Michael Lyon, Bickerstaffe (GB); Christopher Hanley, Whiston (GB)

(73) Assignee: Pilkington Group Limited, St. Helens, Merseyside (GB)

( * ) Notice: Subject to any disclaimer, the term of this patent is extended or adjusted under 35 U.S.C. 154(b) by 342 days.

(21) Appl. No.: 11/922,238

(22) PCT Filed: Jun. 14, 2006

(86) PCT No.: PCT/GB2006/002177
§ 371 (c)(1),
(2), (4) Date: Dec. 14, 2007

(87) PCT Pub. No.: WO2006/134356
PCT Pub. Date: Dec. 21, 2006

(65) Prior Publication Data
US 2009/0130395 A1    May 21, 2009

(30) Foreign Application Priority Data

Jun. 14, 2005   (GB) .................................. 0512077.9

(51) Int. Cl.
*B05D 5/00* (2006.01)
(52) U.S. Cl. ..................................... 427/256; 428/195.1
(58) Field of Classification Search ................ 428/195.1
See application file for complete search history.

(56) References Cited

U.S. PATENT DOCUMENTS

| | | | |
|---|---|---|---|
| 3,244,547 A | 4/1966 | Orr et al. | |
| 4,634,231 A | 1/1987 | Poncelet et al. | |
| 5,153,054 A * | 10/1992 | Depauw et al. | 428/216 |
| 5,162,145 A | 11/1992 | Schaefer | |
| 5,669,951 A * | 9/1997 | Eichhorn | 65/60.1 |
| 5,766,702 A * | 6/1998 | Lin | 428/13 |
| 5,925,160 A | 7/1999 | Sakoske et al. | |
| 5,938,834 A | 8/1999 | Boaz et al. | |
| 6,495,261 B1 * | 12/2002 | Gagliardi et al. | 428/426 |
| 6,890,468 B2 * | 5/2005 | Caldoro et al. | 264/252 |
| 2002/0094407 A1 * | 7/2002 | Frost et al. | 428/77 |
| 2003/0084640 A1 * | 5/2003 | Mason | 52/786.12 |
| 2004/0149154 A1 * | 8/2004 | Geddes et al. | 101/488 |

(Continued)

FOREIGN PATENT DOCUMENTS

DE    44 24 188 C1    12/1995

(Continued)

OTHER PUBLICATIONS

International Search Report dated Oct. 27, 2006 in corresponding International Publication No. WO 2006/134356 A3.

(Continued)

*Primary Examiner* — Shamim Ahmed
(74) *Attorney, Agent, or Firm* — Buchanan Ingersoll & Rooney PC

(57) ABSTRACT

A method of providing a vehicle roof glazing with a printed region having pre-determined optical and/or thermal characteristics is disclosed. Preferably, the glazing forms part of the roof the vehicle, for example, by being a windscreen that extends into the roof, or by being a rooflight or roof glazing system. The region is printed with an ink and the glazing fired, such that the printed region appears semi-opaque after firing. Preferably, the printed region has lower optical and/or thermal transmission characteristics than an unprinted region of the glazing. The pigment loading and/or pigment colour may be used to determine the optical and/or thermal characteristics of the printed region.

18 Claims, 3 Drawing Sheets

U.S. PATENT DOCUMENTS

2004/0170838 A1 * 9/2004 Ambrosius et al. ........... 428/406

FOREIGN PATENT DOCUMENTS

| DE | 198 52 184 A1 | 5/2000 |
|---|---|---|
| EP | 0 120 781 | 10/1984 |
| EP | 0 535 474 A2 | 4/1993 |
| EP | 0 648 715 A2 | 4/1995 |
| EP | 1405744 A1 | 4/2004 |
| FR | 1270513 | 9/1961 |
| FR | 2568197 | 1/1986 |
| GB | 822295 | 10/1959 |
| GB | 1002024 A | 8/1965 |
| JP | 59-182250 A | 10/1984 |
| JP | 62-101516 A | 5/1987 |
| JP | 2001-354447 A | 12/2001 |
| JP | 2002-274892 A | 9/2002 |
| WO | WO 02/072408 A1 | 9/2002 |
| WO | WO 2005/018941 A1 | 3/2005 |
| WO | WO 2005/019360 * | 3/2005 |
| WO | WO 2005/019360 A1 | 3/2005 |

OTHER PUBLICATIONS

English-language summary of a Japanese Office Action dated Sep. 20, 2011 issued in the corresponding Japanese Patent Application No. 2008-516402.

* cited by examiner

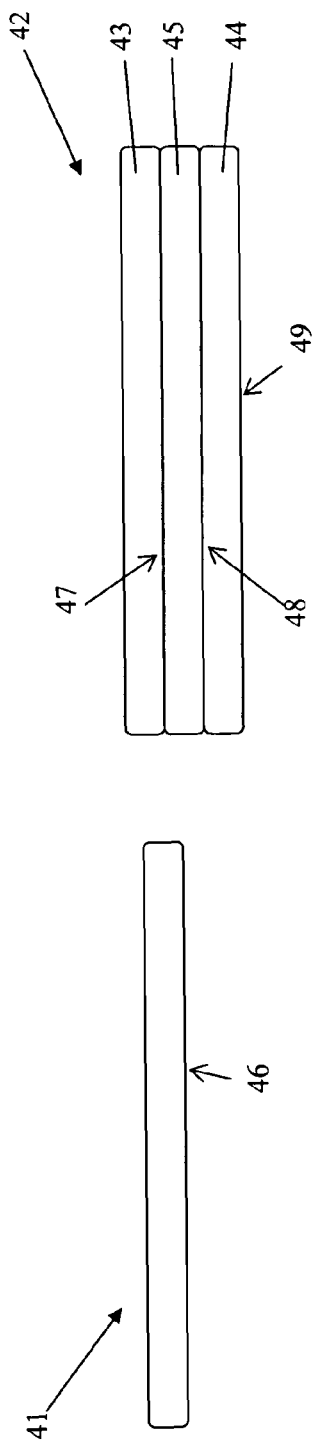
Figure 4a
Figure 4b
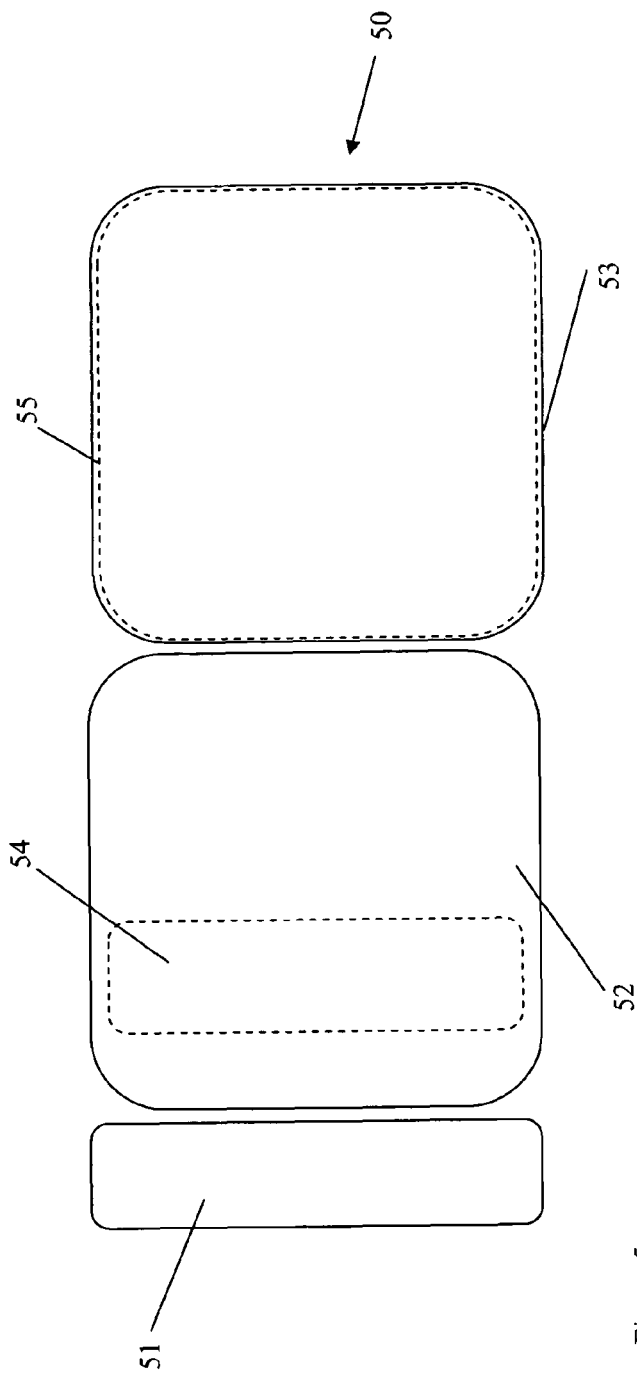
Figure 5

GLAZING

This invention relates to printing of glazings, and in particular, to the printing of glazing products that form part of the roof of a vehicle.

Various techniques are used to reduce the optical and thermal transmission properties of glazings, such as windscreens, used on automotive vehicles. For example, glazings formed of toughened or tempered single sheets of glass may be tinted or have an external thin film coating to reduce glare and thermal transmission. Laminated glazings may have a tinted or printed interlayer.

Glazings which form part of the roof of a vehicle are becoming increasingly popular in both luxury and mass market vehicles. Certain windscreens, for example, cielo windscreens, extend up into the roof of a vehicle. In this situation, as a portion of the roof of the vehicle is made of glass, it is necessary that the thermal and optical properties of the windscreen are reduced as much as possible to ensure the comfort of passengers within the vehicle. Typically, this is done using blinds or shades, but may also involve tinting or coating the glazing. Some roof glazings are contained within the roof of the vehicle, such as rooflights (sometimes known as sun roofs), or form the roof, such as full glass roof glazing systems. Again, it is necessary that the thermal and optical properties of the glazing are tailored as much as possible to ensure the comfort of passengers within the vehicle whilst still allowing sufficient light into the vehicle. It is, however, undesirable that such glazings should be completely opaque (i.e. have zero or near zero optical transmission in the visible region).

A sunshade arrangement may be used, to reduce glare, for example, as in FR 2 568 197. GB 822,295 discloses a window closure having a portion extending into the roof of an automobile. The window closure may be a backlight, a sidelight or a windscreen. The window closure has a metal oxide coating of varying thickness across a portion of its surface, to absorb both heat and light. The coating is thickest in the portion of the window closure that extends into the roof of the automobile. The coating is provided using a spray to form a thin film metal oxide coating, the thickness of which determines the opacity of the film.

EP 1 405 744 also discloses a windscreen/backlight having a portion extending into the roof of a car. In order to reduce the temperature of the inside of the car by reducing the amount of sunlight transmitted by the glass, the windscreen/backlight may be tinted or coloured green or bronze. The area of the window forming part of the roof of the car has a darker colour or tint than the remainder of the window.

DE 198 52 184 discloses a windscreen and a backlight that curve and extend into the roof of a car. The glass of the regions of both the windscreen and the backlight forming the roof of the car are tinted, using an annealed tint, so as to be non-transparent. The tinted region is additionally used as a site for a solar panel.

In the case of laminated glazings, shading can be produced by using a tinted or dyed interlayer, typically PVB. However, the size of the tinted or dyed region may be limited by manufacturing processes.

In the case of glazings contained entirely within or forming the vehicle roof, the use of heavily tinted or coated glass adds to the overall cost of the glazing, as such glass is generally more expensive to produce than standard light green tinted automotive glass. A heavily tinted glass is one where typically, the iron content (measured as $Fe_2O_3$) is greater than 1.2 wt %. This results in an LT (CIE Illuminant A) of between 80% and 39% at 2.1 mm thick. A lightly tinted glass would be one in which the $Fe_2O_3$ content is 1.2 wt % or less for a 2.1 mm glass ply. The greater the amount of iron added, the longer the time taken to switch a float line from producing clear glass to heavily tinted glass. For this reason, relatively little heavily tinted glass is produced. Once produced, the glass must be stored and shipped to its final destination. This may involve shipping glass from one or two float lines to several different countries to produce finished glazings. Additional processing and/or development work may be necessary to turn the glass into a finished product. All of these factors lead to an increase in cost.

The above solutions to reducing the thermal and optical transmission properties involve the use of specialist glass, additional fitting or processing, coloured interlayers (for laminated products) or coatings, in addition to the processing stages required for an ordinary windscreen that does not extend into the roof of a vehicle. This requires extra manufacturing time and cost.

The present invention aims to address these problems by providing a method of providing a vehicle roof glazing with a printed region having predetermined optical and/or thermal transmission characteristics, comprising printing the region with an ink and firing the printed glazing, wherein the printed region has a semi-opaque appearance after firing.

This gives the advantage that the optical and/or thermal transmission characteristics of the glazing can be controlled by using a simple printing process, and at a reduced cost.

Preferably, the printed region has lower optical and/or thermal transmission characteristics than an unprinted region of the glazing. Preferably, the printed region has an optical transmission, measured using Illuminant D65, in the range 10-50%. Preferably the pigment loading and/or pigment colour are used to determine the optical and/or thermal characteristics of the printed region.

The printed region may comprise a plurality of discrete spots of ink. The density of the ink may be varied across the printed region. The ink may be printed as a halftone pattern. A plurality of areas of the printed region may be left unprinted.

Alternatively, the printed region may comprise a continuous coating of ink.

The printed region may have a constant opacity or a non-constant opacity. Alternatively, the opacity of the printed region may change constantly across the width of the region.

Preferably, the ink has a pigment loading of 5-15%. Alternatively, the ink may be a lustre ink, a coloured ink, or a metallic ink.

The ink may be screen printed or printed using a digitally controlled printing device. An opaque obscuration band may be printed around the periphery of the glazing. The step of printing the opaque obscuration band may be carried out before the step of printing the semi-opaque region. The opaque obscuration band may be screen printed. The printed region and the obscuration band may be printed using the same ink. In this case, the opaque obscuration band may be printed at the same time as the printed region.

Preferably, an upper portion of the glazing, which, when fitted into a vehicle, extends into and forms part of the roof of the vehicle, is provided with a printed region. More preferably, the glazing is a windscreen. In this case, the printed region may have a greater opacity at the edge adjacent the roof of a vehicle when fitted.

Alternatively, when fitted, the glazing may form the roof of the vehicle. In this case, the glazing may form part of a roof glazing system. Alternatively, when fitted, the glazing may be contained within the roof of the vehicle. In this case, the glazing may be a rooflight. The printed region may cover a portion of a surface of the glazing, or the printed region may covers an entire surface of the glazing.

The glazing may be a single ply of toughened or semi-toughened glass, or it may be a laminated glazing, comprising first and second plies of annealed or semi-toughened glass, having an interlayer laminated therebetween.

An automotive glazing, printed using the method of the present invention is also provided.

The invention will now be described by way of example only, and with reference to the accompanying drawings, in which:

FIG. 4a is a schematic cross-section of a single-ply toughened rooflight;

FIG. 4b is a schematic cross-section of a laminated rooflight structure; and

FIG. 5 is a plan view of the glazing panels making up a three-part roof.

Figure 1:
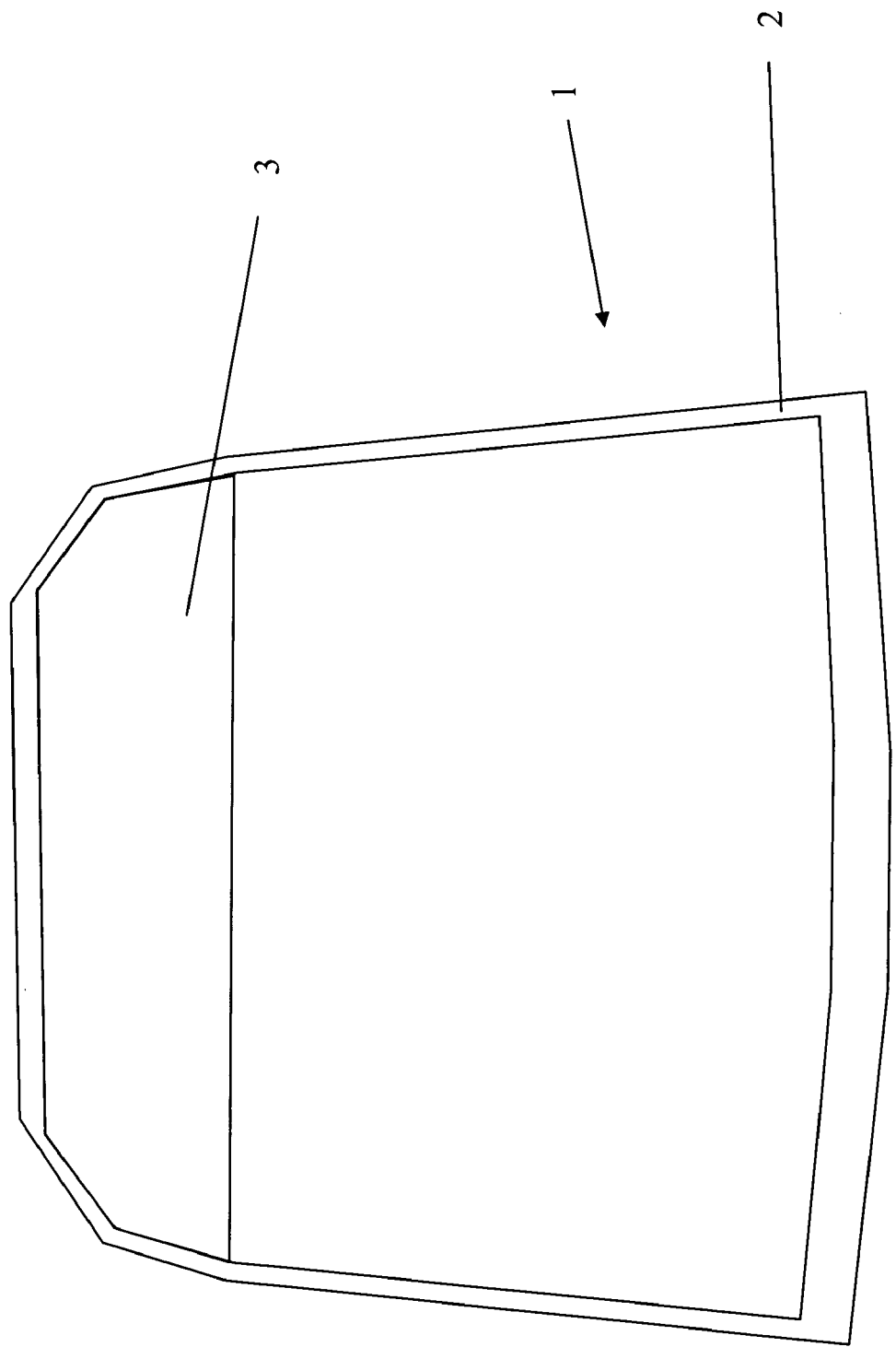
FIG. 1 is a schematic representation of a windscreen showing an obscuration band and a semi-opaque region.

The present invention is concerned with providing a glazing with a printed region having pre-determined optical and/or thermal transmission characteristics. These pre-determined characteristics are preferably a reduction in the optical and/or thermal transmission through the printed region of the glazing, compared with the un-printed region of the glazing. For example, the optical and thermal transmission may be reduced by providing a region acting as a sun shade. Alternatively, the printed region may reflect some incident thermal energy. The optical and/or thermal characteristics may be determined by the ink type, print pattern, print thickness and firing time. In particular, the pigment loading and/or pigment colour are used to determine the optical and/or thermal characteristics of the printed region.

Printing techniques may be used to print images or patterns onto glazings used in automotive vehicles (so-called automotive glazings). For example, automotive glazings, such as windscreens and backlights, are provided with an obscuration band. The obscuration band is typically provided by printing. The purpose of the obscuration band is both functional and aesthetic. The obscuration band covers the adhesive used to fix the glazing into the vehicle, and any other adhesive, for example, that used to fix a rear view mirror to the inside of the glazing. Not only is the adhesive hidden from view, it is no longer exposed to sunlight, preventing damage by UV light.

In order to print an obscuration band, a screen having a negative pattern of the obscuration band is placed onto the glazing. The negative is transferred to the glazing as a positive by holding the screen against the glass and applying coats of ink with a squeegee. Once the ink has been applied to the glazing, the glazing is placed in a drying cabinet to dry the ink. Subsequent to drying, the glazing is fired and may be processed further, for example, by bending. Once printed, the negative pattern of the screen appears as an obscuration band on the glazing.

Digital printing techniques (those controlled digitally, for example, by a computer or digital controller) are also known for printing images and patterns onto glass, in particular, using ceramic inks. For example, WO2005/018941 describes a digital inkjet printer suitable for printing various designs onto glass using a ceramic ink. The printer comprises a horizontal support board, for supporting glass boards to be printed, and a print head that may be moved above the surface of the glass to deposit ink on the surface of the glass board. The head is controlled by a computer or digital controller. The printer also includes heaters to heat the glass surface before and/or after printing in order to provide primary ink fixing. Once printed, the glass board must be fired at 550° C. in a furnace to fix the ink fully. The ink itself then becomes integral with the surface of the glass board. A solvent flush is used, in conjunction with a wiping assembly, to clean the print head before and after a change of ink, after use, or after prolonged down-time.

A ceramic ink, as described in WO2005/019360, is used to print the surface of the glass board. The ink is either solvent-based or water-based, and contains both pigment (having a particle size of less than 1.2 μm) and sub-micron sized glass frit. The water-based inks additionally contain silica nanoparticles. Alternatively, UV-curable inks may also be used.

In order to print, the glass board is first loaded onto the support board, either by hand or using an automated or semi-automated system. Ink is deposited onto the surface of the glass board in accordance with the signals received from the computer or controller, using a standard print head. The print head is able to move above the surface of the glass in either X-axis or Y-axis directions to create an image. The ink is injected onto the surface via a plurality of orifices, and dried using the heaters. If an image is to be printed near the edge of a finished glass board, test marks may be used to ensure that there is no deviation of the printed image. The image printed may be, for example, an opaque obscuration band.

For automotive glazings where a part of the glazing extends into the roof of a vehicle, such as a cielo windscreen, printing techniques can also be used to provide a semi-opaque shade band region to reduce optical and thermal transmission into the vehicle. A cielo windscreen is typically between approximately 1.2 m and 2.5 m in height (compared with a standard windscreen, which is approximately 1 m in height). The portion of the windscreen extending into, and forming part of the roof of the vehicle may be up to 50% of the overall height, with the remainder forming a windscreen region. For glazings extending into and forming part of the roof of a vehicle, or glazings forming or contained within the roof of a vehicle, printing techniques can also be used to provide a semi-opaque region, which may extend across a portion of or an entire surface of the glazing, to reduce optical and thermal transmission into the vehicle, whilst still allowing sufficient light to enter the vehicle to ensure passenger comfort. A semi-opaque region is one which has an optical transmission greater than 0.1% and less than clear glass (which typically has an optical transmission of 90.4%, when measured with Illuminant D65, for a glass thickness of 2.1 mm). Preferably, the optical transmission of the semi-opaque region is between 10% and 50% (measured with Illuminant D65).

FIG. 1 shows a cielo windscreen having a semi-opaque region and an opaque obscuration band. The cielo windscreen 1 has an opaque obscuration band 2 printed around its outer edge. The windscreen also has a semi-opaque region 3 in its upper portion, corresponding to the portion of the windscreen extending into the roof of the vehicle when fitted. The semi-opaque region 3 has reduced optical and thermal transmission characteristics when compared with the unprinted regions of the windscreen.

However, rather than being fully opaque, the semi-opaque region enables a reasonable amount of light to enter the vehicle. The semi-opaque region has higher optical and thermal transmission characteristics than the opaque obscuration band, but lower optical and thermal transmission characteristics than the glass on which it is printed. By varying the opacity of the semi-opaque region, using the techniques described herein, the semi-opaque region can be produced having pre-determined optical and/or thermal transmission characteristics. The opacity of the print may be controlled by varying the ink thickness during printing and/or the firing time.

It may be desirable to print the entire portion of the windscreen that extends into and forms part of the roof of the vehicle, or only a part of this portion. Preferably, the semi-opaque printed region covers the area of the windscreen extending into and forming part of the roof of the vehicle, and extends into the portion forming the windscreen region to just below the position of the rear view mirror boss. The printed region will not normally extend into Zone A, as defined by ECE R43.

Figure 3:
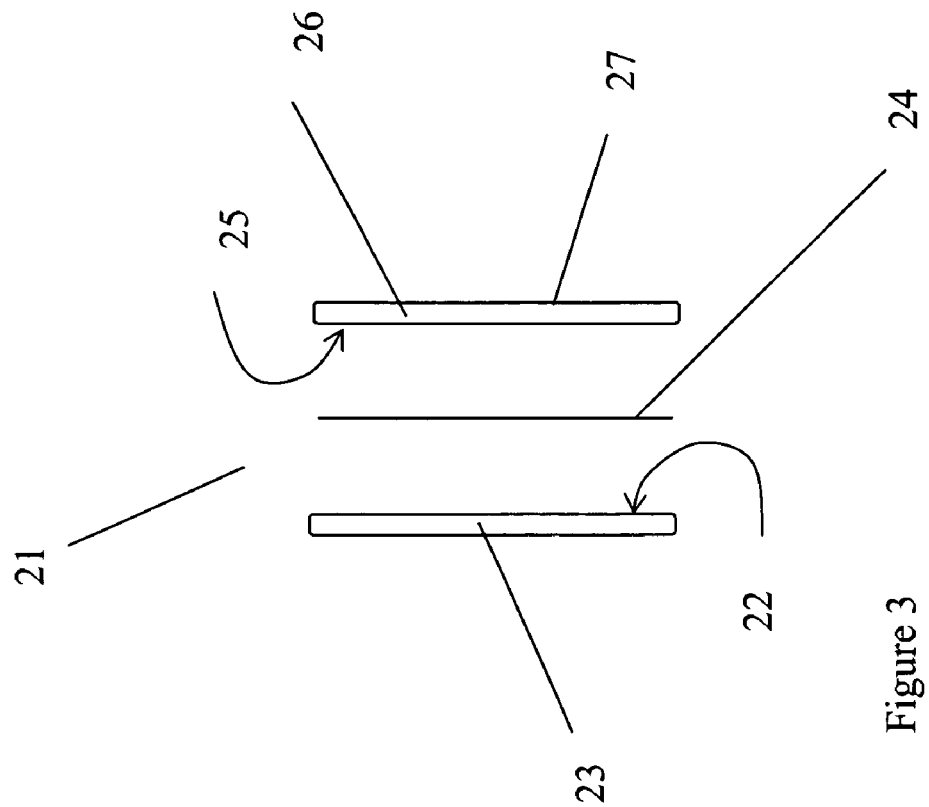
FIG. 3 is a schematic representation of the possible locations of a semi-opaque printed region in a laminated glazing.
Figure 2:
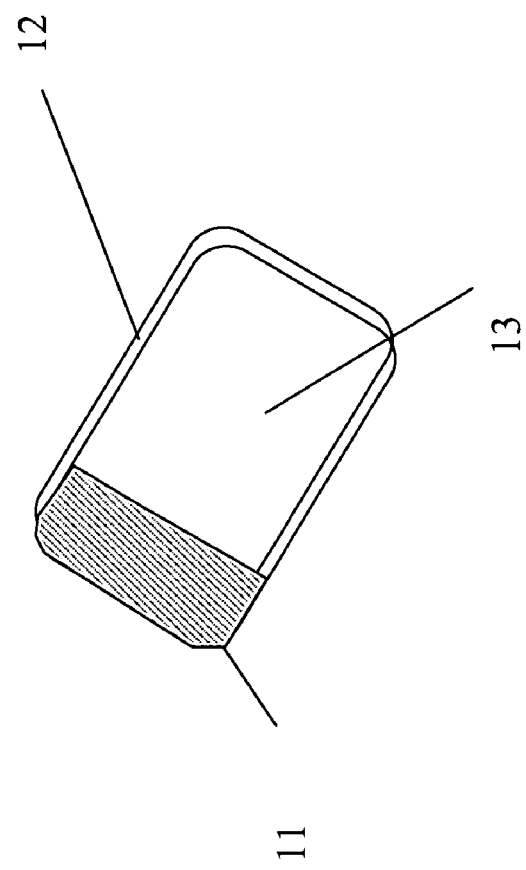
FIG. 2 is a schematic representation of a single sheet of glass having a semi-opaque printed region.

The windscreen may be a single sheet of toughened or tempered glass, as shown in FIG. 2. In this situation, the semi-opaque region 11 is printed on the side of the glass 12 that will form the inside 13 of the windscreen. Typically, such a ply of glass will be between 3 and 6 mm in thickness. However, the screen may be of a laminated construction, typically comprising two sheets of annealed glass, laminated with a single or multilayer laminate, as shown in FIG. 3. Such plies of glass typically have a thickness in the range 1.6 mm to 3.5 mm. If a laminated construction 21 is used, then the semi-opaque region can be printed on the side 22 of the outer ply 23 of glass that is next to the interlayer 24, or the side 25 of the inner ply 26 of glass that is next to the interlayer, or on the side 27 of the inner ply of glass 26 that forms the inside of the laminate when fitted into the vehicle. In addition, the glass used may have a solar control coating and/or a low emissivity coating, or for a laminated windscreen, a solar control interlayer may be used. Other coatings, such as self-cleaning coatings, may be provided on the outer side of the outer ply of glass.

FIG. 4a shows a schematic cross-section of a single-ply rooflight 41, made from toughened glass. Such glazings typically have a thickness in the range 1.8 mm to 4 mm. FIG. 4b shows a schematic cross-section of a laminated rooflight 42. The rooflight 42 comprises first 43 (outer) and second 44 (inner) plies of glass, usually annealed or semi-toughened, having a PVB (polyvinyl butyral) interlayer 45 laminated in between. Single-ply and laminated rooflight constructions offer different advantages and uses. For example, a laminated glazing offers the ability to use an interlayer which absorbs sound (an acoustic interlayer) and greater impact strength, whereas a single-ply glazing is lightweight, which is an important consideration for glazings placed above the centre of gravity of a vehicle. Typically single ply toughened rooflights will be between 1.8 mm and 6 mm in thickness, and glass plies forming laminated rooflights between 1.6 mm and 3.5 mm thick.

As shown in FIG. 4a, a semi-opaque region is printed on the surface 46 of the ply of glass which will face into a vehicle when fitted. As shown in FIG. 4b, a semi-opaque region is printed on of three surfaces: the inner surface 47 of the first 43 (outer) ply of glass, the inner surface 48 of the second 44 (inner) ply of glass, and the outer surface 49 of the second 44 (inner) ply of glass, as shown for the windscreen construction in FIG. 3. Preferably, the semi-opaque region is printed on the inner surface 48 of the second 44 ply of glass. In this location, the semi-opaque region is protected from damage from both inside and outside of the vehicle. In addition, by leaving the inner surface 47 of the first 43 ply of glass print-free, a solar control (heat absorbing) coating may be provided, and by leaving the outer surface 49 of the second 44 ply of glass print-free, a low-emissivity ("low-E") coating may be provided. In the case of laminated glazings, a solar control interlayer may be used. The semi-opaque region may cover a portion of the, or the entire, rooflight.

FIG. 5 is a schematic plan view of the glazing panels forming a full glass roof 50. Such glazing panels are typically of a laminated construction, having two plies of glass in a thickness range 1.6 mm to 3 mm, and a PVB interlayer laminated in between. The small panel 51 is placed at the front of the vehicle, forming a link between the windscreen and the roof panels, and is preferably fully opaque. This may be achieved either by printing one of the plies of glass, or using a coloured PVB interlayer. The remainder of the full glass roof comprises first 52 and second 53 large panels. One of the panels 52, 53, may be an opening panel, either by sliding across the other panel, or by lifting upwards.

A semi-opaque region 54 may be provided to cover only a portion of a glazing panel 52, or a semi-opaque region 55 may be provided across the entire surface of a glazing panel 53, according to preference and the shading effect required.

In contrast to a fully opaque print, such as an obscuration band, the semi-opaque region enables a reasonable amount of light to enter the vehicle. The semi-opaque region has higher optical and thermal transmission characteristics than an opaque obscuration band, but lower optical and thermal transmission characteristics than the glass on which it is printed. By varying the opacity of the final print, the semi-opaque region can be produced having pre-determined optical and/or thermal transmission characteristics. The opacity of the print may be controlled by varying the ink thickness and coverage during printing.

The semi-opaque region may be screen printed using a semi-transparent ink (an ink that has a semi-transparent appearance after firing, and sometimes known as a "thin" black ink). Such inks have a reduced pigment loading compared with non-transparent inks. For example, for the ink to appear semi-transparent when dried on glass, a pigment loading of only 5-15% is necessary. Alternatively, lustre inks, coloured inks or metallic inks can also be used to reduce the optical and/or thermal transmission characteristics. Such inks may also reflect some incident thermal energy.

In order to assess the effectiveness of such semi-opaque prints, two sets of samples were prepared.

Sample Set 1

Four samples of toughened, clear, circular 5 mm thick float glass, measuring 100 mm in diameter were screen printed with a solid band print. Two were printed using an ink comprising a reduced loading of a black ceramic pigment, typical of those used for printing automotive glazings available from Ferro Corporation (Gutleutstrasse 215, PO Box 110403, D-60039, Frankfurt am Main, Germany) and Johnson Matthey plc (Fregatweg 38, 6222 NZ, Maastricht, Netherlands), in an IR medium, and two using lustre inks, one silver (LustReflex Silver, available from Ferro Corporation), one gold (LustReflex Gold, also available from Ferro Corporation). The wet ink print thickness for each sample was approximately 15 μm. Once printed, the samples were fired at 650° C. The ink type, pigment loadings and optical transmission measurements are shown in Table 1 below. Measurements marked "*" were taken using a CARY 5 spectrophotometer with integrating sphere, using Illuminant D65. Measurements marked "**" were taken using a Gretag D200 densitometer at 543 nm.

TABLE 1

Optical transmission measurements for test samples

| Ink Colour (after firing) | Pigment Loading (%) | Visible Transmission (%) * | Visible Transmission (%) ** | UV Transmission (%) * |
|---|---|---|---|---|
| Black | 5 | 44 | 48 | 19 |
| Black | 10 | 24 | 25 | 8 |
| Silver | — | 80 | 89 | 38 |
| Gold | — | 67 | 73 | 19 |

Sample Set 2

A laminated windscreen sample measuring 1.2 m wide by 1 m high was prepared from 2.1 mm (outer) and 1.6 mm (inner) thick plies of float glass having a standard automotive light green tint, and a 0.76 mm clear PVB interlayer. A shade-band measuring 300 mm deep was screen printed onto the inner surface of the inner ply of glass, using a solid band print using a green ink (GU420-654-63, available from Johnson Matthey), having a wet print thickness of approximately 30 μm. Once printed, the plies were bent and fired before laminating. The optical transmission at 543 nm was measured using a Gretag D200 densitometer after lamination, the optical transmission was in the range 43%-47%.

From these samples, it can be seen that a semi-opaque print can be used successfully to reduce the optical and/or thermal transmission characteristics of a glazing. This is particularly useful for replacing physical sun shades, such as blinds, within a vehicle, and for use on glazings which form part of the roof of a vehicle. This is particularly useful for so-called cielo windscreens, which extend into and form part of the roof of the vehicle. By providing such a semi-opaque print, it is possible to produce lightweight single ply, toughened, or laminated roof glazings, which have a reduced thermal and optical transmission compared to clear float glass, without needing to use heavily tinted or coated glass. By using clear or lightly tinted glass, solar control coatings, which may be difficult to provide on heavily tinted glass, may be used.

For both single-ply and laminated glazings, an obscuration band print may be provided around the edge of the glazing, to both protect the adhesive used to fix the glazing into a vehicle from damage by UV rays, and to hide such adhesive from view. For simplicity, the obscuration band is not shown in FIGS. 4a, 4b and 5. The semi-opaque region may be printed over a heating or antenna circuit, or over an electrically conductive region used as a substrate for electronic devices, such as LEDs (light emitting diodes) and sensors.

In order to screen print the semi-opaque region as well as the opaque obscuration band, two printing passes may be used. In the first printing pass, the obscuration band is printed, as described above. In the second printing pass, the semi-opaque region is printed. Registration marks may be used as an aid to aligning the second screen with the printed obscuration band. Although there are tolerances in the alignment process, it is not critical to align the edges of the two patterns exactly, as some overlap is acceptable. Again, once the screen is placed on the glazing, ink is applied using a squeegee. Once the ink is dried, the glazing is fired and the newly printed region appears semi-opaque.

Typically, for both single ply and laminated structures, the firing stage is combined with a bending stage if the glazing is to be bent to shape after printing. For laminated structures, the inner and outer plies may be bent and fired in the same configuration that they will be laminated in, in order to ensure that the plies fit together when the laminate layer is placed in between.

If either of the inner sides of the glass plies in the laminated structure are to be printed, as described above, then a pre-firing stage may be necessary before the plies can undergo any bending. In a pre-firing stage, the printed ply of glass, whilst still flat, is dried and then fired to drive off any organic ink components and to partially sinter the ink. Once cooled, the printed ply of glass can then be placed next to the unprinted ply of glass and both fired and bent to shape. Such pre-firing processes are well known in the art. Some inks, such as those described in EP 0 535 474 B1, do not require a pre-firing process.

Alternatively, the two printing passes may be carried out in reverse order, for example, the semi-opaque region may be printed first, followed by a subsequent printing of the opaque obscuration band.

The semi-opaque region may also be printed using a digital printing process, for example, inkjet printing. This may be achieved using either a single printing pass or two printing passes. The semi-opaque region may comprise a plurality of discrete spots or dots of ink. The pigment loading of the ink and/or the density of the spots is chosen to give the required optical and thermal transmission characteristics. In order to print, ink is ejected from a print head onto the surface of the glass in response to signals sent by a digital controller or computer. The jet may be a continuous stream of charged droplets deflected by high voltage plates, or a drop-on-demand system. The ink propulsion means may be those suitable and known from the art, for example, vibrational (using a piezoelectric print head) or thermal (using a thermal print head such as in bubble jet printing).

The semi-opaque region may be printed before or after an opaque obscuration band is printed on the glazing. This results in two printing passes. Two print heads, a single print head having two ink containers or several nozzles per ink may be used instead. This results in only a single printing pass being necessary to print both the semi-opaque region and the opaque obscuration band. Once printed, the glazing is fired, giving a region that appears semi-opaque. The glazing may also be bent to shape during the firing process. Again, if a laminated structure is to be provided with a semi-opaque region, if no pre-firing process is necessary (as the semi-opaque region is printed on the inside face of the inside ply of glass), both plies are placed together, fired and bent, after printing. If the semi-opaque region is to be printed on the side of either ply facing the laminate, a pre-firing process, as described above, is necessary before any shaping can be done.

It may also be desirable to combine the two methods, for example, to screen print an opaque obscuration band and to digitally print the semi-opaque region depending upon where in the manufacturing process the respective printing stages occur.

The optical and/or thermal transmission characteristics of the semi-opaque region may be constant across the entire printed area. However, it is possible to vary the density of the ink on the surface of the glazing, producing a variation in opacity across the region. This results in a graduated shaded area, which may have a greater opacity on the edge at the top of the glazing adjoining the vehicle roof. This may be as an alternative to, or in addition to, using an ink having a low pigment loading.

The density of the ink in the printed region can be controlled, for example by leaving an amount of glazing unprinted (if a dot pattern or halftone technique is used) or by varying the thickness or optical density of individual dots of ink (if a halftone technique is used).

If a dot pattern is used, small areas, are left unprinted. The larger the unprinted area, or the more areas left unprinted, the greater the optical and/or thermal transmission of the printed region. Alternatively, the semi-opaque region may comprise a plurality of dots, where the size and distribution of the dots is varied to produce a variation in opacity. For example, an opaque region may comprise a distribution of closely spaced, adjacent or overlapping dots, whereas a semi-opaque or graduated region may comprise a plurality of dots having a decreasing diameter and an increasing spatial distribution, but a constant optical density. This may be achieved using either screen printing or digitally controlled techniques, such as inkjet printing. The shape of the dots themselves may be circular, square, hexagonal, rectangular, oval or any other suitable tessellating or non-tessellating shape, depending on the overall effect desired.

Halftone techniques are used to produce printed areas having graduated changes in ink density. Each printed dot has substantially the same printed optical density. However, the sizes of the individual dots are varied in order to produce a graduated shade effect. By varying dot size, not only can the optical and/or thermal transmission characteristics be controlled, but a region having a graduated shading can be produced on the glazing. Alternatively, the dot size of each dot in the pattern is kept constant, and the printed optical density of the dots varied to produce a graduated shade effect. Both dot size and optical density can be varied.

By using dot pattern or halftone techniques, it is possible to use the same ink for printing both the obscuration band and the semi-opaque region.

Although the above method has been described in terms of printing onto a windscreen or roof glazing, it can be used to provide any glazing that extends into and forms part of the roof of a vehicle. For example, backlights and sidelights may have portions that extend into and form part of the roof of a vehicle. In addition, other glazings, such as architectural glazings may be provided with semi-opaque regions using the above-described techniques.

The invention claimed is:

1. A method of providing a vehicle roof glazing with an opaque obscuration band around the periphery of the glazing and with a printed region extending across a portion of the glazing that extends into and forms part of the roof, the printed region having pre-determined optical and/or thermal transmission characteristics, comprising:
    printing an opaque obscuration band around the periphery of the glazing in a first printing pass;
    printing a region with a semi-transparent ink having a pigment loading of 5-15% in a second printing pass which follows the first printing pass; and then
    firing the glazing,
    wherein the printed region comprises a continuous coating of ink, and has a semi-opaque appearance after firing and an optical transmission, measured using Illuminant D65, in the range of 10-50%.

2. The method of claim 1, wherein the printed region has lower optical and/or thermal transmission characteristics than an unprinted region of the glazing.

3. The method of claim 1, wherein the pigment loading and/or pigment colour are used to determine the optical and/or thermal characteristics of the printed region.

4. The method of claim 1, wherein the density of the ink is varied across the printed region.

5. The method of claim 1, wherein the semi-transparent ink is screen printed.

6. The method of claim 1, wherein the semi-transparent ink is printed using a digitally controlled printing device.

7. The method of claim 1, wherein the opaque obscuration band is screen printed.

8. The method according to claim 1, wherein an upper portion of the glazing, which, when fitted into a vehicle extends into and forms part of the roof of the vehicle, is provided with a printed region.

9. The method of claim 8, wherein the glazing is a windscreen.

10. The method of claim 8, wherein the printed region has a greater opacity at the edge adjacent the roof of a vehicle when fitted.

11. The method of claim 1, wherein, when fitted, the glazing forms the roof of the vehicle.

12. The method of claim 11, wherein the glazing forms part of a roof glazing system.

13. The method according to claim 1, wherein, when fitted, the glazing is contained within the roof of the vehicle.

14. The method of claim 1, wherein the glazing is a rooflight.

15. The method of claim 11, wherein the printed region covers a portion of a surface of the glazing.

16. The method of claim 11, wherein the printed region covers an entire surface of the glazing.

17. The method of claim 1, wherein the glazing is a single ply of toughened or semi-toughened glass.

18. The method of claim 1, wherein the glazing is a laminated glazing, comprising first and second plies of annealed or semi-toughened glass, having an interlayer laminated therebetween.

* * * * *